US006598221B1

(12) United States Patent
Pegatoquet et al.

(10) Patent No.: US 6,598,221 B1
(45) Date of Patent: Jul. 22, 2003

(54) ASSEMBLY CODE PERFORMANCE EVALUATION APPARATUS AND METHOD

(75) Inventors: Alain Pegatoquet, Nice (FR); Michel Auguin, Cagnes s/Mer (FR); Olivier Sohier, Valbonne (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/549,234

(22) Filed: Apr. 13, 2000

(51) Int. Cl.[7] .................................................. G06F 9/45
(52) U.S. Cl. ........................................................ 717/152
(58) Field of Search ................................. 717/140, 162, 717/124–135; 703/20, 22

(56) References Cited

U.S. PATENT DOCUMENTS

| | | | | |
|---|---|---|---|---|
| 5,287,510 A | * | 2/1994 | Hall et al. .................... | 717/160 |
| 5,535,393 A | | 7/1996 | Reeve et al. .................. | 395/700 |
| 5,606,698 A | * | 2/1997 | Powell ......................... | 717/161 |
| 5,732,273 A | * | 3/1998 | Srivastava et al. ............ | 717/128 |
| 5,862,383 A | | 1/1999 | Laitinen ....................... | 395/708 |
| 5,933,641 A | | 8/1999 | Ma .............................. | 395/705 |
| 5,966,143 A | | 10/1999 | Breternitz, Jr. .............. | 345/709 |
| 5,966,539 A | * | 10/1999 | Srivastava ................... | 717/156 |
| 6,282,706 B1 | * | 8/2001 | Chauvel et al. .............. | 717/150 |
| 6,286,132 B1 | * | 9/2001 | Tanaka et al. ............... | 717/125 |
| 6,286,135 B1 | * | 9/2001 | Santhanam .................. | 717/146 |
| 6,292,938 B1 | * | 9/2001 | Sarkar et al. ................ | 717/138 |
| 6,408,428 B1 | * | 6/2002 | Schlansker et al. ........... | 716/17 |
| 6,427,234 B1 | * | 7/2002 | Chambers et al. ........... | 717/140 |

OTHER PUBLICATIONS

Leupers et al., "Retargetable Compilers for Embedded DSPs", Nov. 1997, Microprocessor Systems and Electronic Commerce Conference (EMMSEC), 7TH European Multimedia.*
Rao et al., "Storage Assignment using Expression Tree Transformation to Generate Compact and Efficient DSP Code", May 1999, ACM SIGPLAN Notices, Proceedings of the ACM SIGPLAN '99 conference on Programming language design and implementation, vol. 34 Issue.*
Liao et al., "Code optimization Techniques for Embedded DSP Microprocessors", Jan. 1995, Proceedings of the 32nd ACM/IEEE conference on Design automation conference.*

* cited by examiner

*Primary Examiner*—Tuan Q. Dam
*Assistant Examiner*—Tuan Ann Vu
(74) *Attorney, Agent, or Firm*—Peter Zawilski (57) ABSTRACT

An assembly code performance evaluation apparatus is provided which includes a host computer, a target digital signal processor (DSP) compiler, and a performance estimation program. The host computer includes processing circuitry, memory and a host compiler to use test sequences and generate dynamic information. The target digital signal processor compiler communicates with the processing circuitry. The performance estimation program is implemented on the host processing circuitry and is operative to annotate application source code and to generate an estimation of an optimized assembly code. A method is also provided.

17 Claims, 10 Drawing Sheets

ASSEMBLY CODE PERFORMANCE EVALUATION APPARATUS AND METHOD

TECHNICAL FIELD

This invention pertains to digital data processing and compiler systems. More particularly, this invention relates to techniques for performing an estimation of an optimized assembly code from the C code of an application that is delivered to a C compiler.

BACKGROUND OF THE INVENTION

The programming of digital signal processor (DSP) applications in high level languages such as C is becoming more prevalent as applications become increasingly more complex. However, current DSP C compilers are generally unable to exploit numerous DSP specific architectural features when attempting to produce efficient assembly code. Therefore, in order to respect tight real-time constraints, programmers commonly write DSP code by hand. However, the programming of such code in assembly language has become increasingly difficult since DSP applications are becoming larger and more complex. Furthermore, the writing of efficient assembly code for new DSP architectures, such as for a Very Long Instruction Word (VLIW) processor, presents a very challenging task.

SUMMARY OF THE INVENTION

A tool is provided for estimating an optimized assembly code from the C code of an application. An ability is provided to locate computationally intensive parts of the application. Furthermore, the tool provides a metric of the quality of the produced assembly code. More particularly, an estimation of a hand-written assembly code is generated from an intermediate description (RTL) of an application.

According to one aspect, an assembly code performance evaluation apparatus is provided which includes a host computer, a target digital signal processor (DSP) compiler, and a performance estimation program. The host computer includes processing circuitry, memory and a host compiler to use test sequences and generate dynamic information. The target digital signal processor compiler communicates with the processing circuitry. The performance estimation program is implemented on the host processing circuitry and is operative to annotate application source code and to generate an estimation of an optimized assembly code.

According to another aspect, an assembly code performance evaluation apparatus includes a host computer, a target digital signal processor (DSP) compiler, and a performance estimation program. The host computer includes processing circuitry, memory and a host compiler. The host compiler is operative to execute the program using test sequences and to generate dynamic information. The target digital signal processor (DSP) compiler communicates with the processing circuitry. The performance estimation program is implemented on the processing circuitry and is operative to annotate application source code and to generate an estimation of an optimized assembly code.

According to yet another aspect, a method is provided for evaluating performance of an optimized DSP assembly code. The method includes: providing an application C source code; providing at least one test sequence to generate dynamic information; annotating the application source code with the dynamic information; and generating an estimation of an optimized assembly code.

According to even another aspect, a method is provided for evaluating performance of assembly code. The method includes: providing a target compiler; providing a C code annotated with dynamic information based upon execution of the C code with test sequences on a host computer; generating an RTL intermediate representation of the application; defining a set of rewriting rules; applying the set of rewriting rules to the RTL intermediate representation; and generating an estimation of an optimized assembly code.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

An apparatus and a method are provided for generating software estimates which assist programmers using a target C compiler such that the compiler can be used more efficiently, and the programmer is only required to write a minimal amount of assembly code. A tool is provided that enables the generation of estimations of an optimized assembly code which acts as a reference measure for the programmer during implementation of an application on a DSP. A set of rewriting rules is then applied to an intermediate RTL representation in order to match as closely as possible a DSP execution scheme. Such an intermediate representation allows accurate estimates for a class of DSP architectures to be obtained.

Details for annotating an intermediate representation of an application source code are disclosed in Applicant's co-pending U.S. patent application Ser. No. 09/548,398, entitled "Apparatus and Method for Annotating an Intermediate Representation of an Application Source code", naming inventors as Alain Pegatoquet, Michel Auguin, and Olivier Sohier, filed concurrently herewith, and herein incorporated by reference.

Reference will now be made to a preferred embodiment of Applicant's invention. One exemplary implementation is described below and is depicted with reference to the drawings comprising a tool for performing an evaluation of assembly code from a C compiler, and also for making an estimate of an optimized assembly code. While the invention is described via a preferred embodiment, it is understood that the description is not intended to limit the invention to this embodiment, but is intended to cover alternatives, equivalents, and modifications such as are included within the scope of the appended claims.

In an effort to prevent obscuring the invention at hand, only details germane to implementing the invention will be described in great detail, with presently understood peripheral details being incorporated by reference, as needed, as being presently understood in the art.

Figure 1:
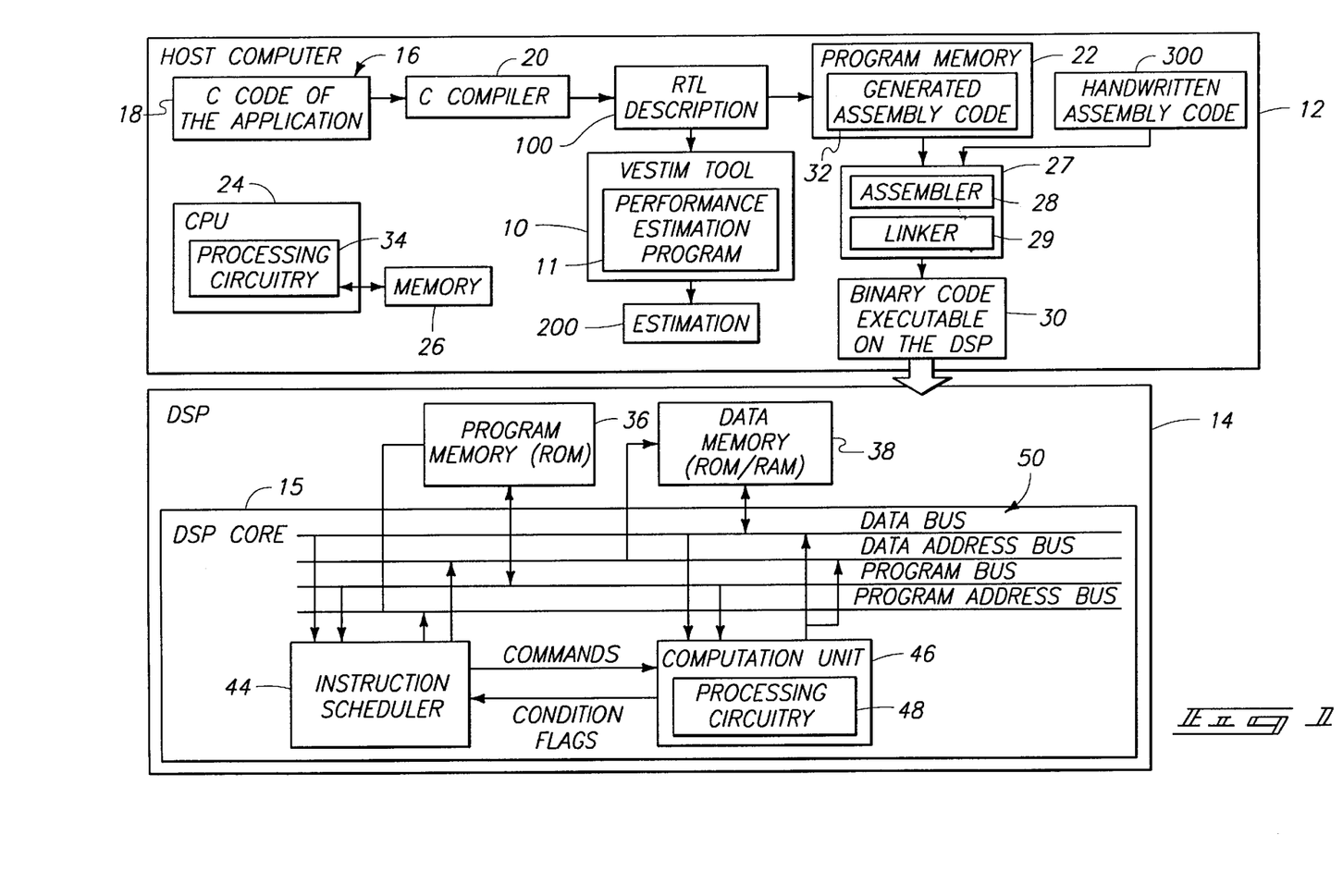
FIG. 1 is a schematic block diagram illustrating a host computer, including an assembly code performance evaluation tool, and a digital signal processor (DSP).

FIG. 1 illustrates a program tool, hereafter referred to as a VESTIM tool, identified by reference numeral 10. Tool 10 is provided in a host computer 12, and includes a performance estimation program 11. Host computer 12 is signal coupled to interact with a digital signal processor (DSP) 14. Host computer 12 includes a software application program 16 rendered in C code 18; a C compiler 20; a Register Transfer Language (RTL) description 100; program memory 22; a central processing unit (CPU) 24; memory 26; translation/compilation programs 27, including an assembler 28 and a linker 29; binary code 30 that is executable on DSP 14; a VESTIM tool 10; an estimation 200 of an optimized assembly code; and handwritten assembly code 300.

As shown in FIG. 1, assembly code 32 is first stored in host program memory 22. According to one construction, program memory 22 comprises random access memory (RAM) and/or read only memory (ROM). Additionally, CPU 24 comprises processing circuitry 34.

DSP 14 has a construction that can benefit from the present invention. DSP 14 includes a DSP core 15, a program memory (ROM) 36, a data memory (ROM/RAM) 38. DSP core 15 includes an instruction scheduler 44, a computation unit 46, and internal buses 50. Computation unit 46 includes processing circuitry 48.

According to one construction, program memory 36 is formed at least in part from a read only memory (ROM). Other alternative forms of memory are also possible as understood in the art. Also according to one construction, data memory 38 is formed from read only memory (ROM) and/or random access memory (RAM).

DSP core 15 includes instruction scheduler 44, computation unit 46, and internal buses 50. Internal buses 50 comprise a data bus, a data address bus, a program bus, and a program address bus.

Computation unit 46 comprises processing circuitry 48, such as a central processing unit (CPU). In operation, instruction scheduler 44 sends commands to computation unit 46, and computation unit 46 sends condition flags to instruction scheduler 44.

According to one construction, DSP 14 comprises a special-purpose CPU that is typically used for digital signal processing. Such special-purpose CPU, realized via computation unit 46 and processing circuitry 48, provides ultra-fast instruction sequences, such as shift and add, and multiply and add, which are typically utilized in math-intensive signal processing applications. DSPs, such as DSP 14 of FIG. 1, are used in a wide variety of devices, including cellular telephones, sound cards, modems, fax machines, and digital televisions.

In an effort to minimize the amount of assembly code 300 that is written by hand so as to reduce the time-to-market for a DSP product, a methodology has been developed by Applicant which is detailed below. The methodology entails making more efficient usage of DSP C compilers, such as C compiler 20 of FIG. 1.

In order to make more efficient usage of C compilers, performance improvements needed to be realized for assembly code 32 that is generated by C compiler 20. More particularly, the quality of code 32 that is generated by C compiler 20 is very dependent on the C code 18 of an application, and improvements to such code 32 are needed in order to more efficiently use C compiler 20.

By implementing a technique that respects defined C coding rules when designing C code of the application 18, the performance of the generated assembly code 32 may be significantly improved. Moreover, it is well known that, for numerous signal processing applications, a percentage of only 20% to 30% of the C code 18 represents about 80% to 90% of the computational requirements when a program is implemented on DSP 14. Hence, optimization efforts will be focused on this computationally intensive 20% to 30% of C code 18.

Such relatively critical portions of C code 18 are typically found to comprise a series of inner nested loops. Tools like "gprof" or "tcov" may be used to profile a C code, as described below.

The "gprof" tool, or program, produces an execution profile of a C program. This profile gives the total execution time and call count for each function of the application. However, results provided by "gprof" are obtained from an execution on the host processor (e.g., a Pentium II). Applicant's experiments have shown that the performance obtained using "gprof" is significantly different from the results obtained in simulation for the target DSP assembly code (with the same input file). This is because one cannot expect to obtain similar performance measures (and similar percentage per function) if the host (where "gprof" runs) and the target architecture (here a DSP) are too different.

The "tcov" program provides only the number of times each C statement is executed, not execution times. This information is therefore not usable to locate with accuracy critical functions of the application.

In order to assist programmers, a specific tool is provided by Applicant's invention, hereinafter referred to as VESTIM. VESTIM tool 10 has been developed so as to provide two kinds of estimation. First, VESTIM tool 10 provides a performance evaluation of the assembly code 32 that is generated by C compiler 20. Results of the performance evaluation are given in a table, at the function or basic block level, making it easier to locate critical parts of the application program 16. Secondly, VESTIM tool 10 provides via an intermediate representation, or RTL description 100, an optimized assembly code in the form of estimation 200. That is, VESTIM tool 10 provides an estimation 200 of an optimized assembly code via performance estimation program 11 that appears as if the assembly code had been handwritten by an experienced programmer. The estimation provides a metric, or measurement, that represents a lower bound on execution times. The metric provides an asymptotic value that is compared with the generated assembly code 32. As a result, it becomes easier to determine if C compiler 20 has produced an efficient code 32.

One benefit provided by implementing Applicant's technique results in that the above-described measures are provided without having to execute any time-consuming target DSP simulation. Accordingly, execution time to arrive at the estimation 200 of an optimized assembly code is greatly decreased over what it would take if target DSP simulations were used.

A further goal of Applicant's technique is to reduce the software development time for writing a handwritten assembly code 300, thereby reducing the time-to-market for a resulting product, as will be described below in greater detail.

One technique for reducing the time used to write assembly code 300 is to maximize use of C compiler 20 (of FIG. 1). As a result, a developer will reduce the amount of assembly code 300 that is written by hand to the minimum level possible, thereby reducing the time-to-market. The quality of generated assembly code 32 can be improved by tuning the original C source code 18 to best match the target compiler (see FIG. 2), that is the target DSP 14. As shown in FIG. 1, it is understood that C compiler 20 corresponds with a target compiler within DSP 14. For example, the use of pointers instead of indexed arrays improves the performance of code 32 that is generated by C compiler 20 via RTL description 100. It is also possible to reduce overhead by limiting variable life range or specifying data location in different memory banks, such as in XRAM or YRAM memory banks.

Furthermore, in order to assist a compiler 20 in its optimization process, C coding rules can be derived for a target DSP 14. But without any specific tools, the profiling of the generated assembly code becomes a tedious task that requires the use of time-consuming target processor simulations. In order to guide a programmer from the C description 18 of an application 16, the VESTIM tool 10 (a) locates computationally intensive parts of the code; and (b) provides a metric, or measurement, of the quality of the produced assembly code.

Accordingly, VESTIM tool 10 of Applicant's invention allows for the identification of target blocks of C code 18 for optimization. Furthermore, VESTIM 10 tool allows for parts of C code 18 being efficiently compiled, or being compiled without having a significant, detrimental influence on global performance to be identified. Additionally, VESTIM tool 10 provides estimation for a code program size. A high code density is particularly desired when machine code is stored on a chip since such density contributes to a relatively low silicon area, and thus low system cost, and low power dissipation.

As described below, an estimation technique and method is globally detailed. Subsequently, a set of rules is presented in order to obtain a DSP oriented computational scheme using the apparatus detailed in FIG. 1.

According to the construction depicted in FIG. 1, it is understood that DSP C compilers are generally unable to produce an efficient assembly code that respects tight real-time constraints when designing and implementing embedded applications. For example, such tight real-time constraints are encountered when designing cellular telephone systems. Accordingly, this is the reason why programmers commonly write DSP code by hand. The writing of handwritten assembly code has become more and more unacceptable because applications, as well as recent DSP architectures, are becoming more and more complex. The use of performance estimations that are provided by Applicant's VESTIM tool makes it possible to more efficiently use a C compiler, thereby enabling a designer/programmer to write less assembly code by hand.

As shown in FIG. 1, an application will generally be formed by a mix between assembly code generated by a C compiler and assembly code that is written by hand. Applicant's VESTIM tool is used to reduce the handwritten portion, typically formed from inner loops, to a minimum level, thereby reducing the time-to-market encountered in designing a product.

I. Estimation Method

Figure 2:
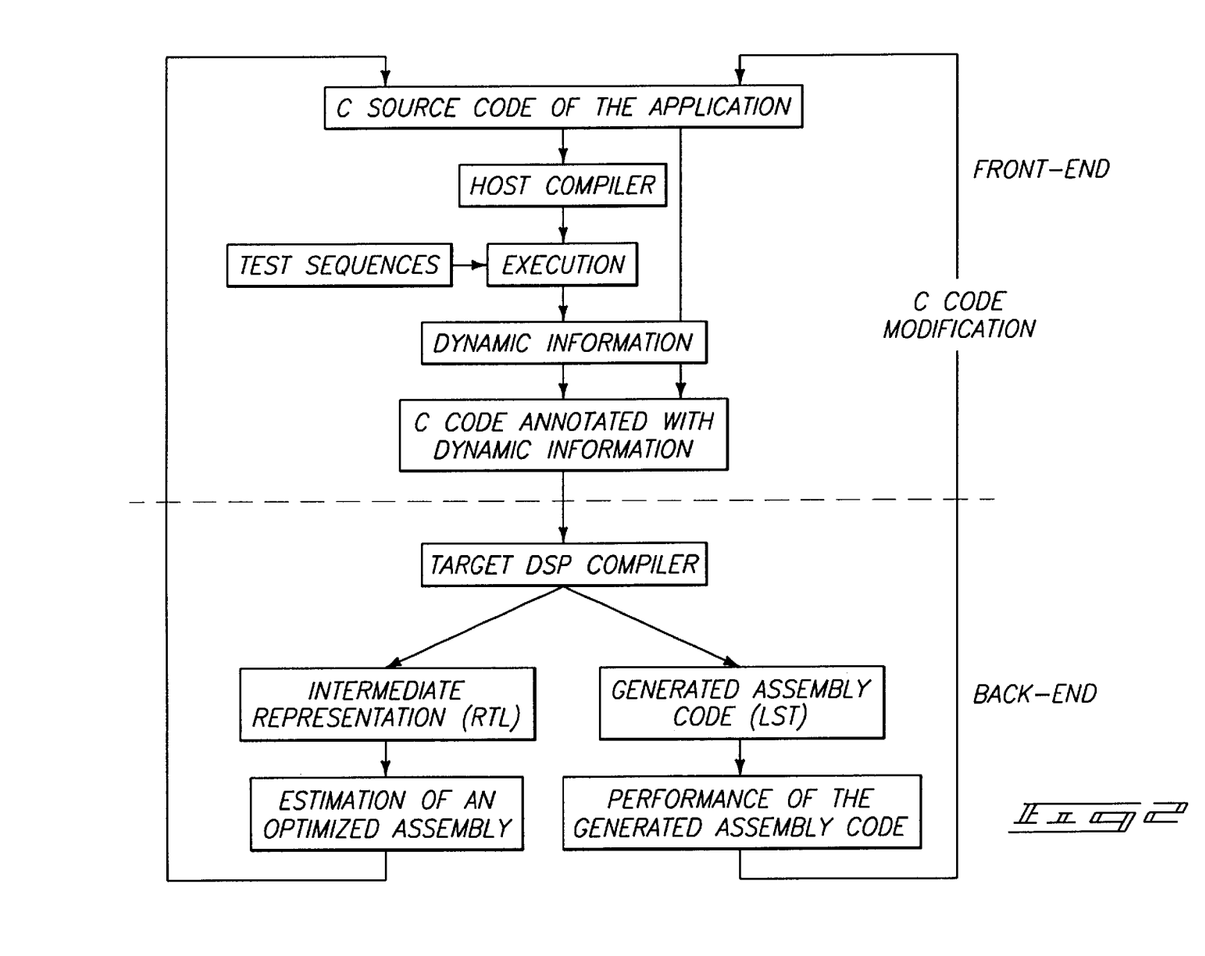
FIG. 2 is a block diagram illustrating global flow for the performance evaluation tool provided by the present invention.

FIG. 2 illustrates in block diagram form the estimation process of Applicant's VESTIM tool 10 (of FIG. 1). As shown in FIG. 2, the estimation process is shown divided into two independent parts: a "front-end" and a "back-end". In order to perform estimations, dynamic information is first collected. The dynamic information represents the number of executions of each C statement (or group of C statements present within a basic block). It is understood that a basic block represents a sequence of instructions with no breaking point (i.e., without any control). In other words, a basic block has a single ENTRY point and a single EXIT point, and may also have several connected components. In VESTIM, a basic block is represented by a Data Flow Graph (DFG). Each node of a DFG is an operation, while edges represent data dependencies between these operations.

Dynamic information may be obtained using different approaches. Some authors propose a "static" method (i.e., techniques that use results of information collected at or before compile time). However, this method requires the programmer to provide information such as loop upper bounds. From an industrial point of view, this approach is inappropriate for complex applications having deeply interdependent or nested control structures. Therefore, Applicant's technique uses a "statistical" approach (also called "dynamic") in order to collect dynamic information.

A. Collecting Dynamic Information (Front-End)

A method is adapted based on the execution of the C code with a test sequence. The C code is then annotated with this dynamic information. The test sequence coverage must correspond to a good approximation of the worst case execution time. As shown in FIG. 2, Applicant's VESTIM tool 10 (of FIG. 1) provides: (1) performance of the generated assembly code (LST); and (2) estimation of a handwritten assembly code from an intermediate description (Register Transfer Language, or RTL) of the application.

The metrics shown in FIG. 2 are obtained without any target DSP simulation, which avoids the need to conduct time-consuming profiling simulation.

B. Performance of the Generated Assembly Code (LST)

Performance of the generated assembly code is obtained by multiplying the dynamic information with the number of cycles to execute instructions of the generated assembly code (LST) for each C statement of the application.

C. Estimation of an Optimized Assembly Code

In order to evaluate the quality of the LST code, a computation is made of a lower performance bound from the RTL intermediate representation of the application provided by, for example, a GNU based OakDSPCore™ C Compiler (OCC). The lower performance bound represents an estimation of an optimized handwritten assembly code.

The RTL level is composed of different passes where most of the work of the compiler is performed. When using the VESTIM tool, a specific pass is used in the RTL flow where traditional optimization techniques are implemented, but before the register allocation phases. Thus, problems related to memory spilling are avoided because this pass uses a large number of virtual registers. This pass also includes extensions added to the C language, such as the distribution of data in DSP memories, but this pass remains very OakDSPCore™ independent. The VESTIM tool is thus generic to a class of modified Harvard type DSP architectures.

Figure 3:
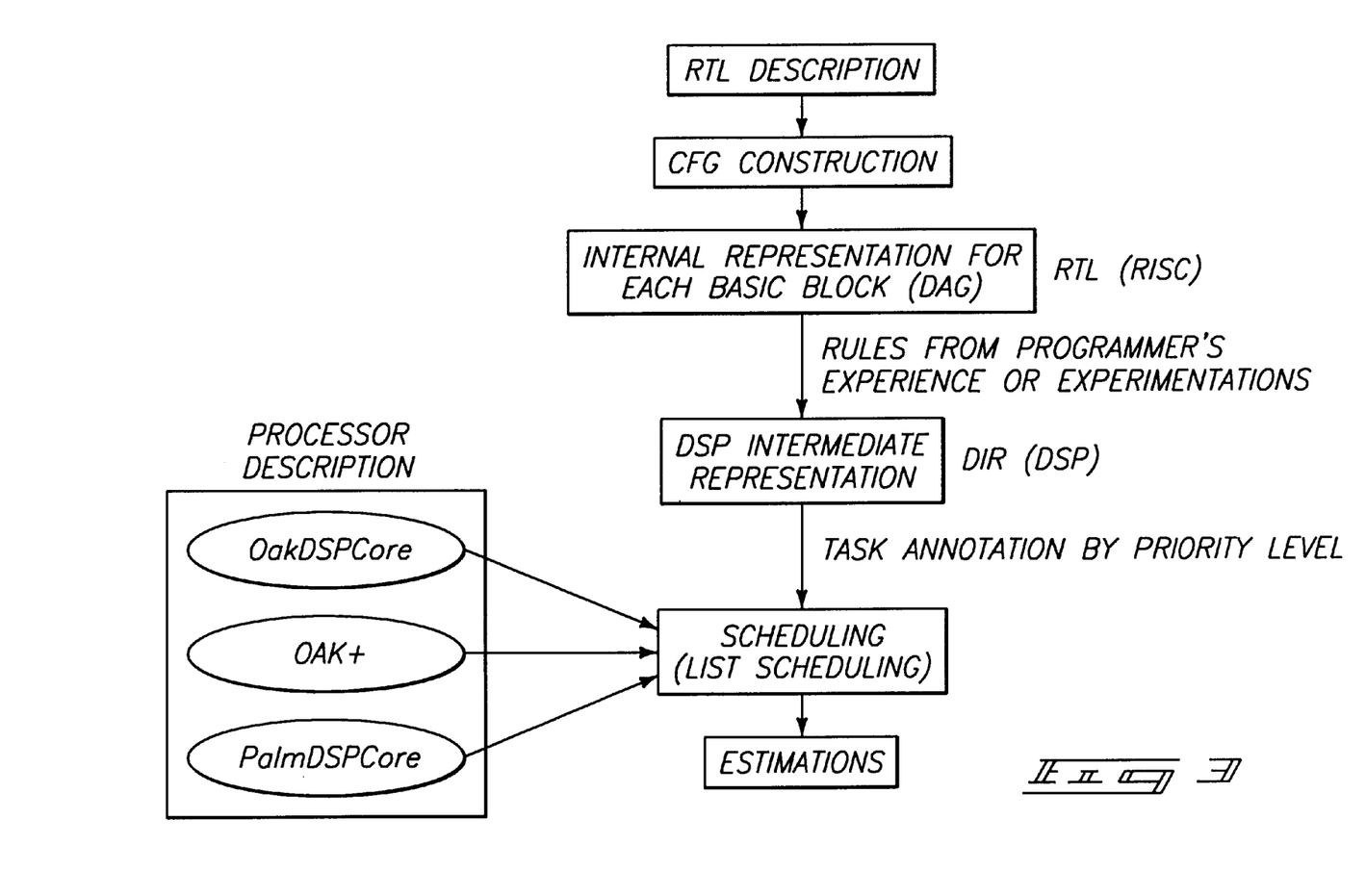
FIG. 3 is a block diagram illustrating the estimation flow from an RTL description.

FIG. 3 shows the estimation flow from an RTL description and comprises the "back-end" left portion of FIG. 2. First, a control flow graph (CFG) representing the structure of the application is built. A CFG describes the control flow of each basic block of a program. Each basic block has its own dynamic information. The estimation process will determine the number of cycles for each basic block for a target DSP processor.

In order to support a class of modified Harvard type DSP architectures, an internal generic processor model is adopted. The target DSP is described using an external processor description. Applicant's DSPs designed by VLSI Technology, Inc., now Philips Semiconductors Corporation, and identified by model numbers VVF3500 and VVF4000 DSPs, which stand respectively for the DSP Group OakDSPCore™ and PalmDSPCore™, are the first DSPs included in the estimator.

D. A DSP Oriented Computational Scheme

During experiments it was noted that accurate estimation could not be performed using the RTL representation since it is RISC (Reduced Instruction Set Computer) oriented in the GNU C compiler. RISC architectures have a load-store model: each memory access or operation is performed through registers. However, for many DSPs this is a restrictive model leading to unnecessary operations. Moreover, the RTL representation contains operations not optimized by the compiler; i.e., operations that an experienced DSP programmer rarely uses.

At this point, a set of rewriting rules was defined. This set of rewriting rules is applied to the RTL representation in order to obtain a DSP Intermediate Representation (DIR) adapted to perform software estimations (see FIG. 3). Applicant's invention and this disclosure relate to this set of rules.

E. DIR Annotation by Priority Level

Before the scheduling phase, each node of the DIR is annotated by a priority level (see FIG. 3). This number is equal to the cycle-based distance between this node and the most distant leaf node of the DIR. This cycle-based distance takes into account the pipeline parallelism of the DSP: two sequential nodes in the DIR have the same priority level if they can have a pipeline or parallel execution in the DSP. The annotation gives priority to operations that allow more distant leaf nodes to be scheduled earlier since nodes with high priority levels are scheduled first. Depending on the target DSP parallelism, the data flow graph representing a basic block is annotated, or scheduled, in different ways.

F. Scheduling Phase

The objective of the scheduling phase is to aggregate operations of the DIR into a minimum number of cycles corresponding to instructions of the target DSP. A list-scheduling heuristic that works at operation level, rather than instruction level, is used since a DSP instruction may be composed of several operations. A typical example is a MAC (Multiply and Accumulate) instruction that regroups four operations: multiply, add, and two read memory operations. The list-scheduling algorithm manipulates a list of data-ready operations ordered by their priority level. Data-ready operations are nodes of the DIR with all their predecessors' nodes scheduled. Once the task is scheduled, its successors are inserted in the first position of the list of tasks with the same priority.

II. A Set of Rules to Obtain a DSP Oriented Computational Scheme

A set of rewriting rules was defined by Applicant. The set of rewriting rules is applied to the RTL representation in order to: (a) match as closely as possible a DSP execution scheme, thereby enabling the performance of the best possible software estimations.

The rewriting rules can be divided into two categories: (a) rules that remove useless operations; and (b) rules that synthesize or help to synthesize DSP specific instructions.

These rules are applied on a Directed Acyclic Graph (DAG) representing each basic block of the program. A DAG is a directed Data Flow Graph (DFG) without any cycle. According to one implementation, these rules come either from the programmer's experience or experimentation performed with the OakDSPCore™ and PalmDSPCore™. However, these rules are common to a class of Harvard DSP architecture.

Some rules are interdependent, leading to constraints on their order. Therefore, the rules described below must be applied in a specific order. Moreover, some rules are applied after the scheduling phase.

It is important to note that these rules are used in order to perform an estimation of an optimized assembly code (as if it had been handwritten by an experienced programmer). Therefore, the corresponding data flow graph cannot be used to generate a valid assembly code.

Appendix A below lists a set of rewriting rules 1–18 used for a class of DSP architecture and which are implemented via Applicant's technique, along with respective definitions. FIGS. 4–13 correspond with selected ones of the rewriting rules which are graphically depicted in the corresponding figure, as identified below.

Figure 4:
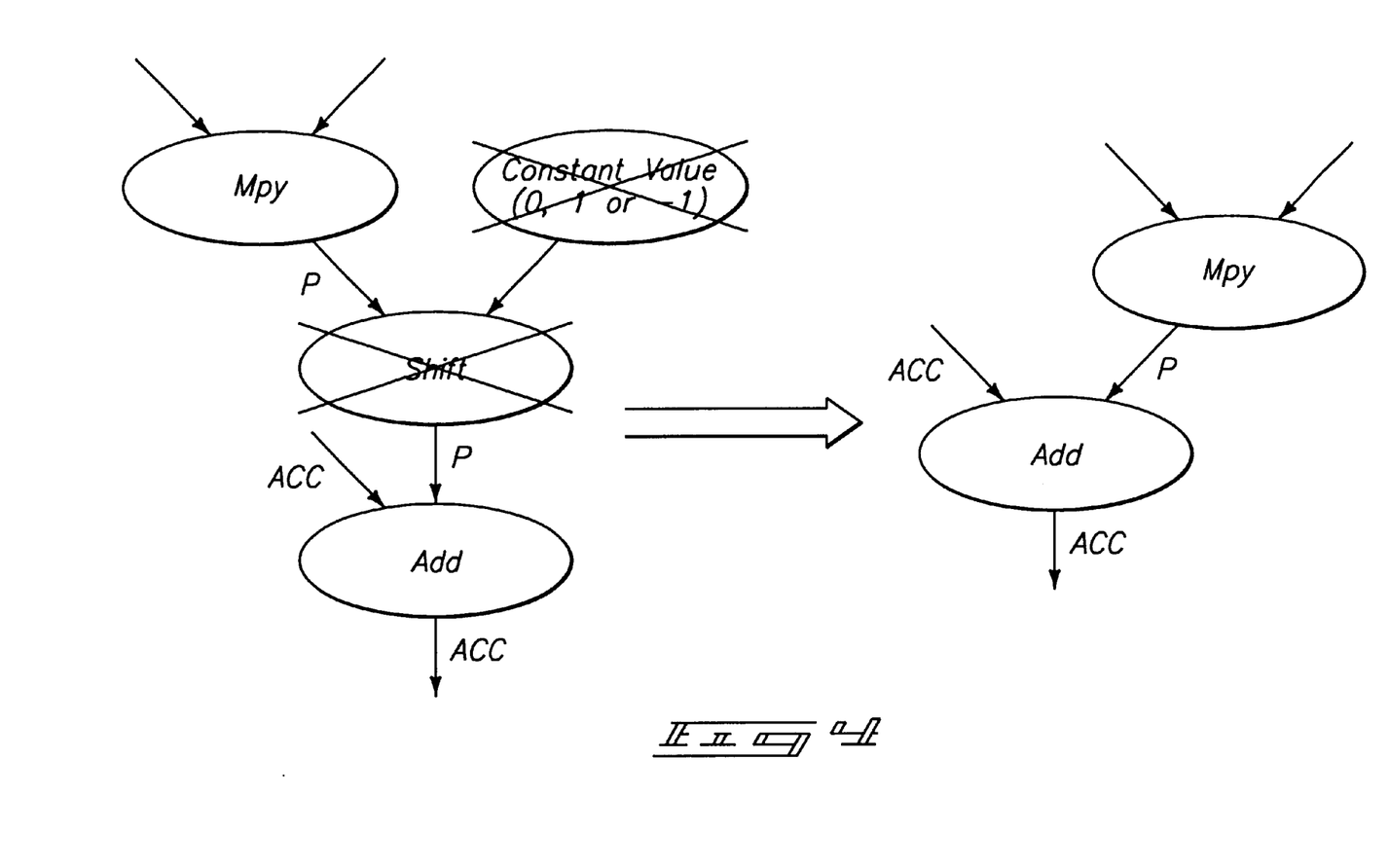
FIG. 4 is a graphical depiction of Rule 4 illustrating the removal of a shift operation by 0, 1, or −1 after a multiplication operation.

In FIG. 4, Rule 4 is depicted wherein a shift operation by 0, 1 or −1 after a multiplication operation, or node "Mpy", is removed since it is a useless operation. An implicit use of the PS (Pre-Scaling) register is assumed.

Figure 5:
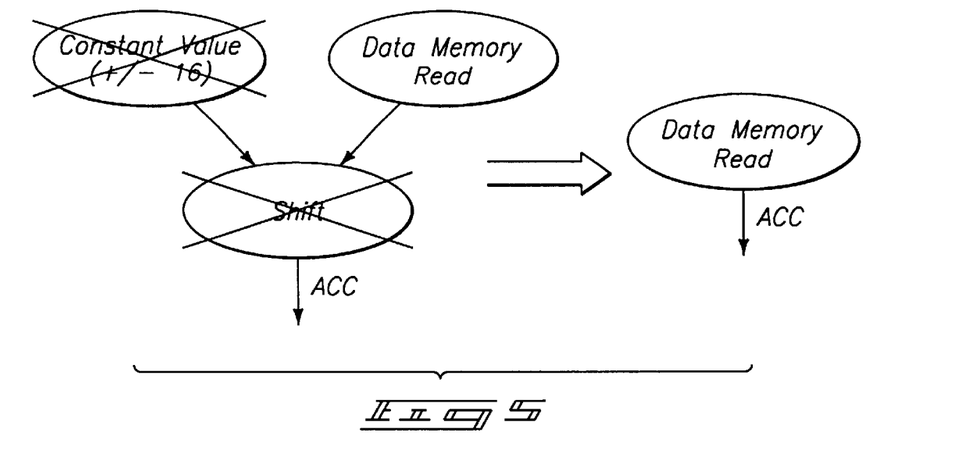
FIG. 5 is a graphical depiction of Rule 5 illustrating the deletion of a shift operation after a memory read or write operation.

In FIG. 5, Rule 5 is depicted wherein a shift operation by +/−16 after a memory read (or write) operation using an indirect addressing node is deleted since it is a useless operation.

Figure 6:
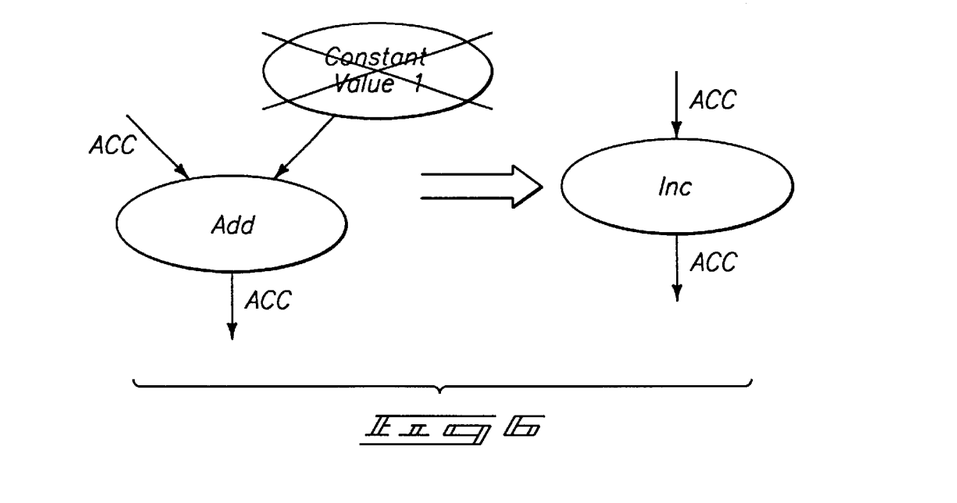
FIG. 6 is a graphical depiction of Rule 10 illustrating an addition between an accumulator and a constant value equal to "1" which is replaced by an increment operation.

In FIG. 6, Rule 10 is depicted wherein an addition between an accumulator and the constant value 1 is replaced by an) increment operation, or node "Inc".

Figure 7:
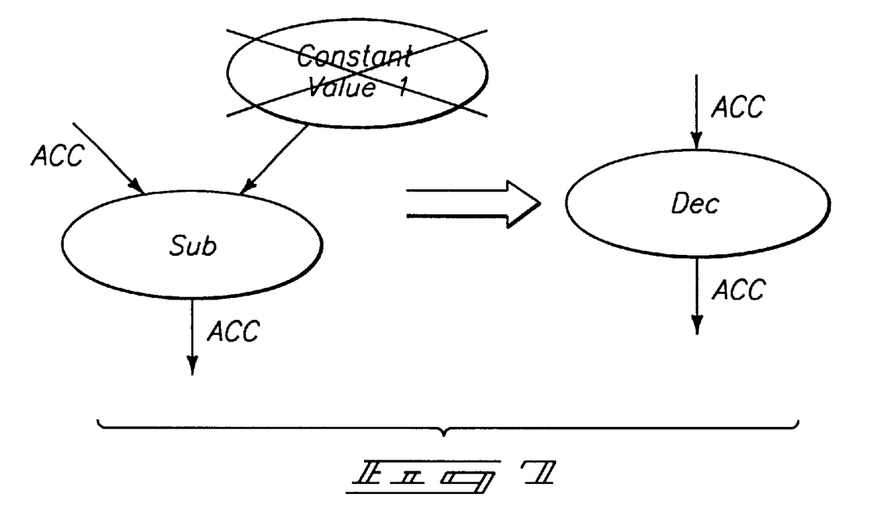
FIG. 7 is a graphical depiction of Rule 11 illustrating a subtraction between a constant value equal to "1" and an accumulator which is replaced by a decrement operation.

In FIG. 7, Rule 11 is depicted wherein a subtraction between a constant value equal to 1 and an accumulator is replaced by a decrement operation, or node "Dec".

Figure 8:
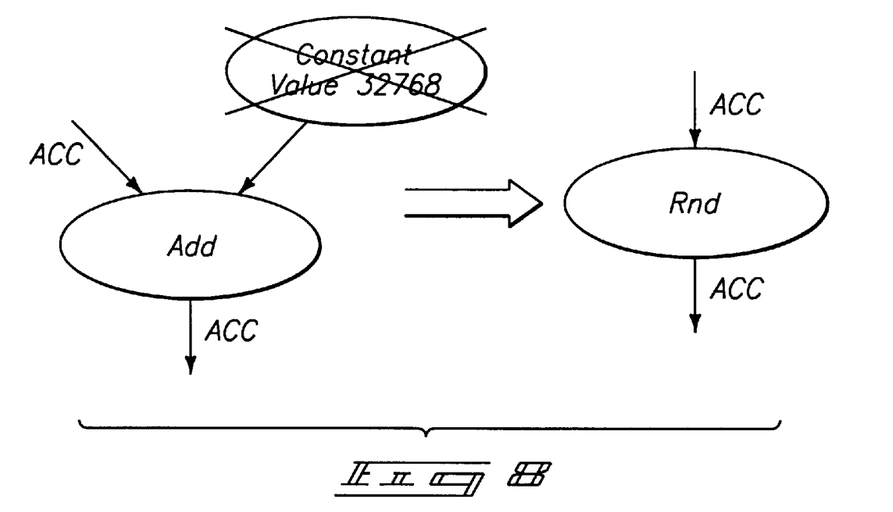
FIG. 8 is a graphical depiction of Rule 12 illustrating an addition between an accumulator and a 0X8000 value which is replaced by a rounding operation.

In FIG. 8, Rule 12 is depicted wherein an addition between an accumulator (ACC) and the 0x8000 constant value (i.e., 32768 in decimal) is replaced by a rounding operation on the accumulator, or node "Rnd".

Figure 9:
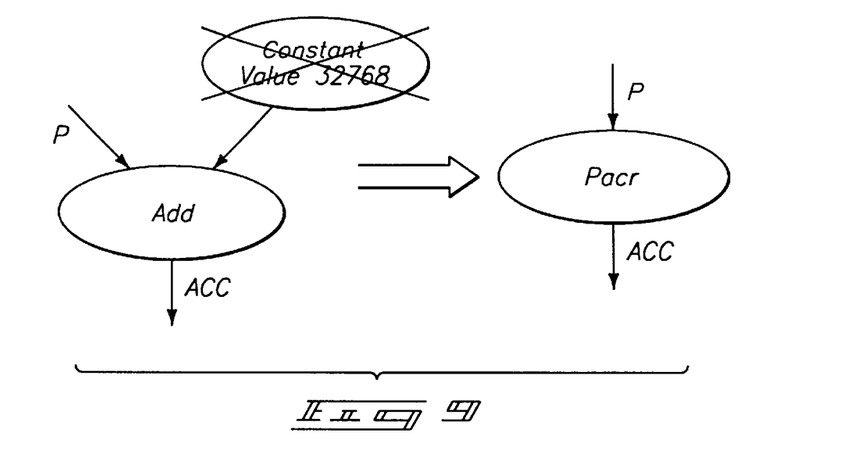
FIG. 9 is a graphical depiction of Rule 13 illustrating an addition between a P register and a 0X8000 value which is replaced by a rounding operation on this register.

In FIG. 9, Rule 13 is depicted wherein an addition between the P register (output of the multiplier) and the 0x8000 constant value (i.e., 32768 in decimal) is replaced by a rounding operation on this register node, or node"Pacr".

Figure 10:
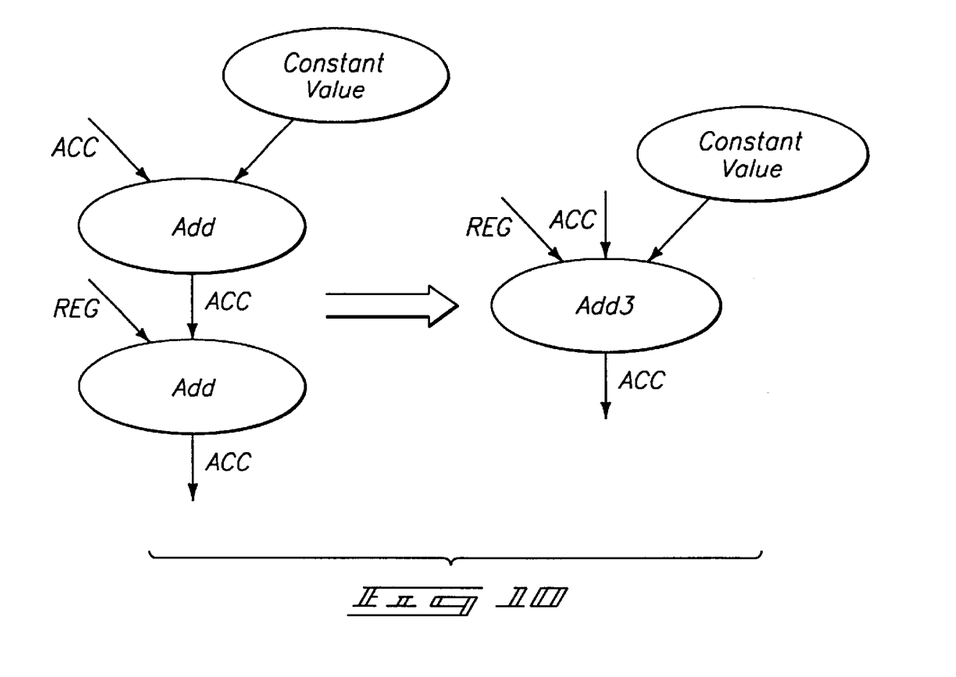
FIG. 10 is a graphical depiction of Rule 14 illustrating synthesis of a 3-input adder operation from two consecutive addition operations.

In FIG. 10, Rule 14 is depicted wherein this rule synthesizes a 3-input adder operation, or node "Add3", from two consecutive addition operations, or nodes "Add". This rule must be used only if the target DSP has a 3-input adder (e.g., the PalmDSPCore™).

Figure 11:
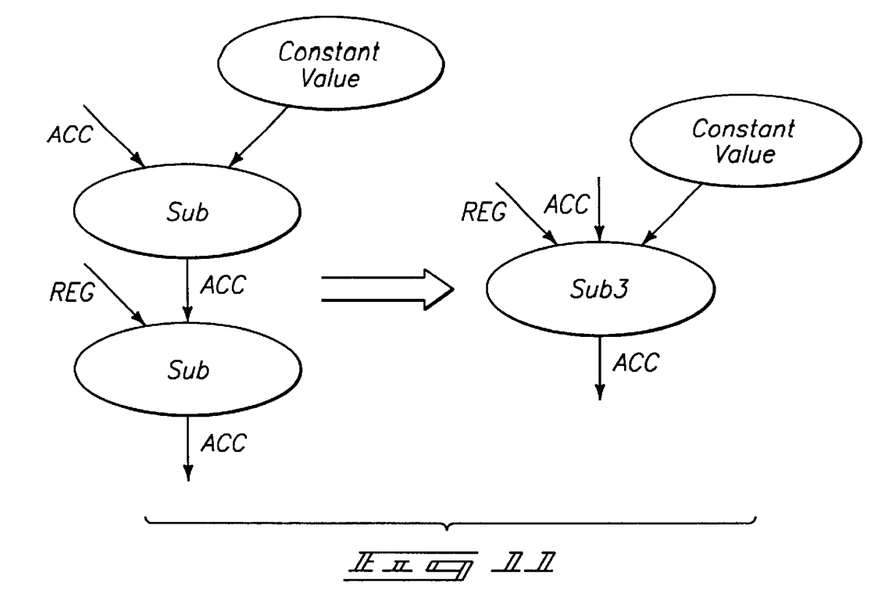
FIG. 11 is a graphical depiction of Rule 15 illustrating synthesis of a 3-input sub operation from two consecutive subtraction operations.

In FIG. 11, Rule 15 is depicted wherein this rule synthesizes a 3-input sub operation, or node "Sub3", from two consecutive subtraction operations, or nodes "Sub". This rule must be used only if the target DSP has a 3-input adder (e.g., the PalmDSPCore™).

Figure 12:
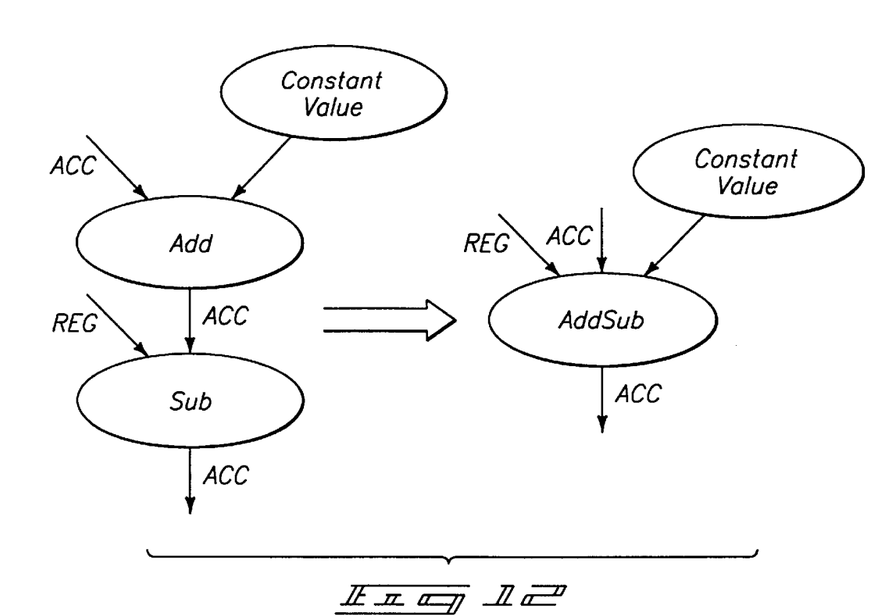
FIG. 12 is a graphical depiction of Rule 16 illustrating synthesis of a 3-input addition and subtraction operation from one addition operation followed by a subtraction operation.
Figure 13:
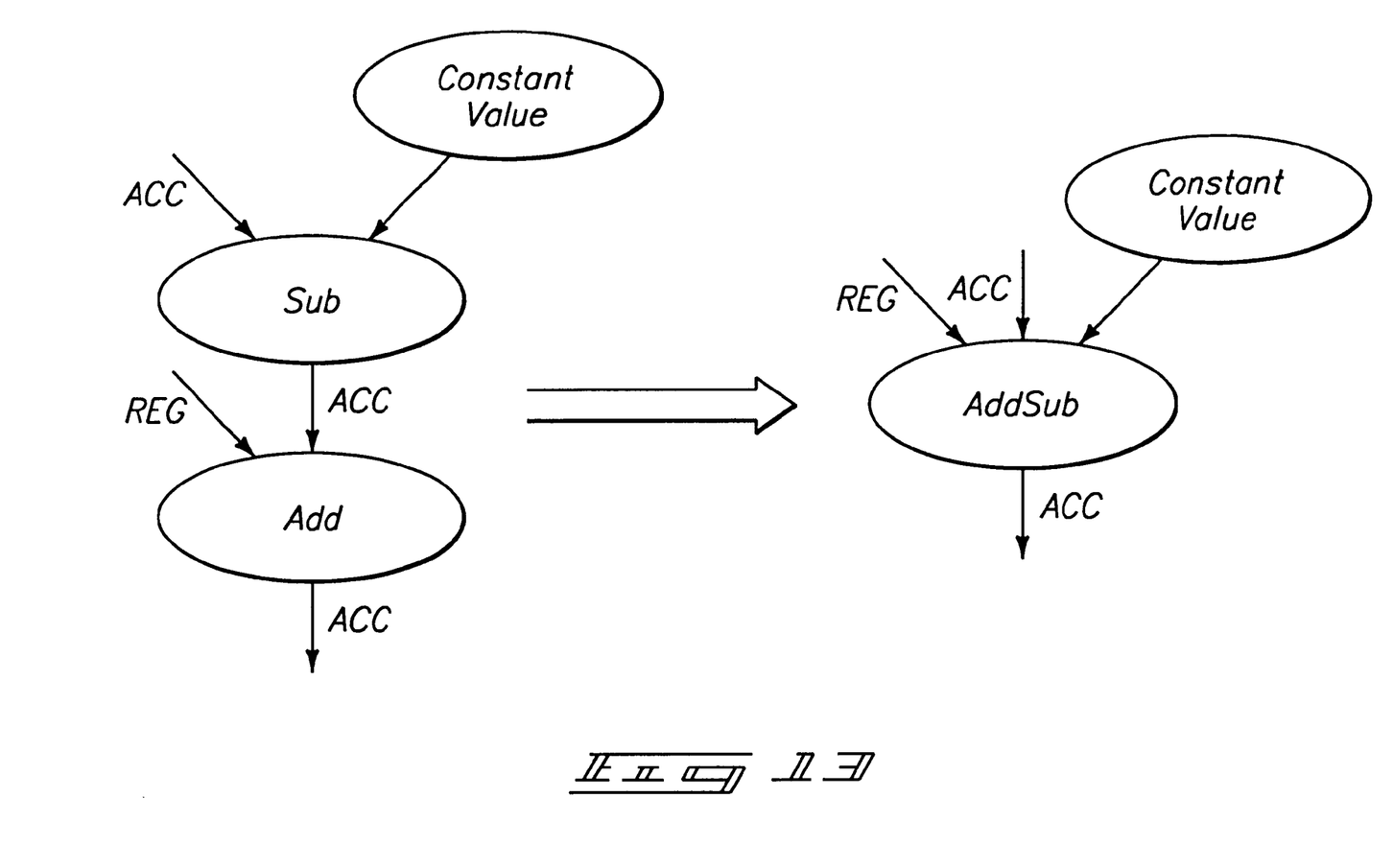
FIG. 13 is a further graphical depiction of Rule 16 illustrating synthesis of a 3-input addition and subtraction operation from one subtraction operation followed by an addition operation.

In FIGS. 12 and 13, Rule 16 is depicted wherein this rule synthesizes a 3-input addition and subtraction operation, or node "AddSub", either from ($1^{st}$ case—see FIG. 12) one addition operation (node "Add") following by one subtraction operation (node "Sub"), or ($2^{nd}$ case—see FIG. 13) one subtraction operation (node "Sub") following by one addition operation (node "Add"). This rule must be used only if the target DSP has a 3-input add/sub (e.g., the PalmDSPCore™).

III. VESTIM Provides Performance Results (Estimation 200 of FIG. 1) in Tables With Two Levels of Granularity A. Function Level (see Table 1)

For each function of the application the following information is provided (see below with respect to the G.728 application encoder on the OakDSPCore™).

Function: function name (sorted by decreasing order of the cycles number),

Generated asm: performance of the generated assembly code, given in cycles and percentage (compared to the total MIPS requirements), Estimation: estimated performance of an optimized assembly code, given in cycles and percentage, C size: number of C statements, Dyn (dynamic analysis): number of total cycles (after an execution) divided by number of total C statements (after an execution), Stat (static analysis): number of total cycles (without execution, only by parsing the generated assembly code) divided by number of total C statements (only by parsing the C source files), Exp rate (expansion rate): generated assembly code cycles divided by estimated optimized assembly code cycles, Nb exec: number of execution of the function.

The example on Table 1 shows that, when using VESTIM, it is easy to locate computational intensive parts of the application. In order to analyze more accurately these critical functions, VESTIM provides performance at a basic block level as well (available for both generated code and estimation of an optimized assembly code). The following table illustrates this feature for the bloc14m function.

B. Basic block level (see Table 2)

On the example shown in Table 2, it is apparent that basic blocks $B_3$ and $B_5$ are the bottlenecks of this function.

IV. Conclusions

In conclusion, software estimations provided by Applicant's VESTIM tool assist programmers to use a target C compiler more efficiently and write as little assembly code as possible. Estimations of an optimized assembly code act as a reference measure for the programmer during the optimization process. This approach allows time-to-market to be significantly reduced. For example, with a G.728 Annex G application, which is a speech compression algorithm standardized by the International Telecommunication Union (ITU), it has been shown that by using estimations provided by the VESTIM tool, the implementation time can be reduced by two-thirds compared to a purely hand-coded implementation. In such case the implementation time has been reduced to three weeks instead of two months of work.

A set of rewriting rules has been defined and is applied to the intermediate RTL representation in order to match as closely as possible a DSP execution scheme. This DSP Intermediate Representation (DIR) is well suited to perform accurate estimations for a class of DSP architectures.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

TABLE 1

|  | Perf (Mcyc) | Prg sze (words) |
|---|---|---|
| Generated Asm | 62.3 | 4652 |
| Estimation | 28.4 | 2858 |

| | Generated asm | | Estimation | | C size | | | Exp | Nb |
|---|---|---|---|---|---|---|---|---|---|
| Function | (cyc) | (%) | (cyc) | (%) | (stmt) | Dyn | Stat | rate | exec |
| bloc50m | 16372457 | 26.3 | 5058328 | 17.8 | 84 | 4.9 | 2.8 | 3.2 | 400 |
| bloc17m | 17204258 | 18.0 | 6754596 | 23.8 | 36 | 3.4 | 2.8 | 1.7 | 1600 |
| hwmcore | 9875768 | 15.9 | 2694083 | 9.5 | 79 | 2.8 | 4.5 | 3.7 | 1200 |
| bloc14m | 6270236 | 10.1 | 3699225 | 13.0 | 17 | 3.1 | 2.4 | 1.7 | 401 |
| bloczirm | 3434697 | 5.5 | 2337977 | 8.2 | 51 | 3.7 | 4.0 | 1.5 | 1600 |
| bloc9m | 2034015 | 3.3 | 1030346 | 3.6 | 71 | 6.6 | 4.8 | 2.0 | 1600 |
| bloc49m | 1337576 | 2.1 | 816416 | 2.9 | 23 | 5.6 | 5.0 | 1.6 | 400 |

TABLE 1-continued

| | | | | | | | | | |
|---|---|---|---|---|---|---|---|---|---|
| bloc96m | 48800 | 0.1 | 43200 | 0.2 | 7 | 6.1 | 3.3 | 1.1 | 1600 |
| init | 697 | 0.0 | 687 | 0.0 | 67 | 1.2 | 2.2 | 1.0 | 1 |
| Total | 62306252 | 100.0 | 28406680 | 100.0 | 1061 | 3.5 | 3.5 | 2.2 | |

TABLE 2

| | Perf (Mcyc) | Prg sze (words) | | | |
|---|---|---|---|---|---|
| Generated Asm | 6.3 | 51 | | | |
| Estimation | 3.7 | 27 | | | |

| | Generated asm | | Nb | | |
|---|---|---|---|---|---|
| Basic blk | (cyc) | (cyc/ex) | exec | C In | Asm In |
| B1 | 5213 | 13 | 401 | 69 | 1932 |
| B2 | 359296 | 7 | 51328 | 74 | 1969 |
| B3 | 2823040 | 11 | 256640 | 79 | 2002 |
| B4 | 769920 | 1 | 769920 | 81 | 2024 |
| B5 | 2053120 | 8 | 256640 | 83 | 2038 |
| B6 | 256640: | 5 | 51328 | 87 | 2064 |
| B7 | 3007 | 7 | 401 | 90 | 2084 |
| Total | 6270236 | | | | |

APPENDIX A

| RULES | DESCRIPTION |
|---|---|
| Rule 1 | This rule removes register affectation nodes whenever it is possible. This rule comes from what we call the "RISC Inheritance" of GNU-based C compiler, or the "load-store" model. In a load-store model, all accesses to data memory are performed through registers. |
| Rule 2 | A multiplication operation, or node "Mpy", with two identical input data is synthesized in a square root node, or node "Sqr". |
| Rule 3 | This rule removes two consecutive "Neg" operations. |
| Rule 4 | This rule removes a shift operation by 0, 1 or -1 after a multiplication operation, or node "Mpy", since it is a useless operation. An implicit use of the PS (Pre-Scaling) register is assumed (see FIG. 4). |
| Rule 5 | This rule deletes a shift operation by +/- 16 after a memory read or write operation using an indirect addressing mode since it is useless (see FIG. 5). |
| Rule 6 | This rule replaces an addition operation, or node "Add", with a negative operand by a subtraction operation, or node "Sub", with a positive operand. |
| Rule 7 | This rule removes a comparison operation, or node "Cmp", with 0 before a branch operation, or node "brr", since it is a useless treatment. |
| Rule 8 | All operations using the PS register are removed. |
| Rule 9 | This rule removes all arithmetic operations that perform computations on address registers within nested loops. It is assumed that these operations are useless. In other words, it is assumed that the DSP effectively uses complex addressing modes. This rule requires a list of address registers. |
| Rule 10 | An addition between an accumulator and the constant value 1 is replaced by an increment operation, or node "Inc". Useful for conditional operations (see FIG. 6). |
| Rule 11 | A subtraction between a constant value equal to 1 and an accumulator is replaced by a decrement operation, or node "Dec". Useful for conditional operations (see FIG. 7). |
| Rule 12 | An addition between an accumulator and the 0x8000 value is replaced by a rounding operation on the accumulator, or node "Rnd". Useful for conditional operations (see FIG. 8). |

APPENDIX A-continued

| RULES | DESCRIPTION |
|---|---|
| Rule 13 | An addition between the P register (output of the multiplier) and the 0x8000 value is replaced by a rounding operation on this register, or node "Pacr". Useful for conditional operations (see FIG. 9). |
| Rule 14 | This rule synthesizes a 3-input adder operation, or node "Add3", from two consecutive addition operations, or nodes "Add". See FIG. 10. This rule must be used only if the target DSP has a 3-input adder (e.g., the PalmDSPCore ™). |
| Rule 15 | This rule synthesizes a 3-input sub operation, or node "Sub3" from two consecutive subtraction operations, or nodes "Sub" (see FIG. 11). This rule must be used only if the target DSP has a 3-input adder (e.g., the PalmDSPCore ™). |
| Rule 16 | This rule synthesizes a 3-input addition and subtraction operation, or node "AddSub", either from (see FIG. 12) one addition operation (node "Add") followed by one subtraction operation (node "Sub"), or from (see FIG. 13) one subtraction operation (node "Sub") followed by one addition operation code (node "Add"). This rule must be used only if the target DSP has a 3-input add/sub (e.g., the PalmDSPCore ™). POST SCHEDULING RULES |
| Rule 17 | This rule removes a useless branch operation in case of conditional operation (see example in FIG. 14). |
| Rule 18 | This rule changes a block repeat operation, or node "Bkrep", into a repeat operation, or node "Rep", if only one instruction is repeated. |

APPENDIX "B"—Definitions

Figure 14:
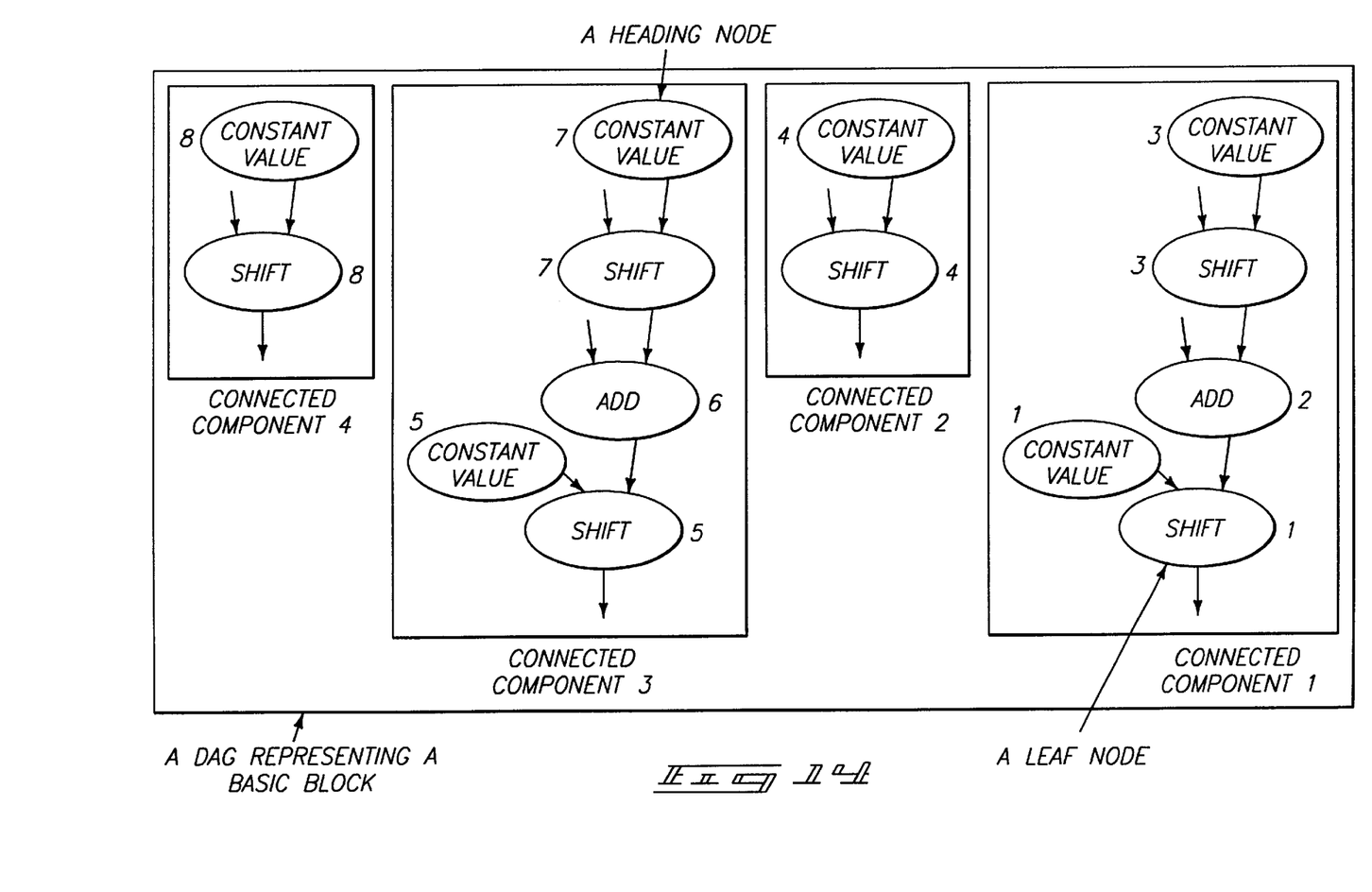
FIG. 14 is a graphical depiction, by example, of a basic block with four connected components.

Note: FIG. 14 provides graphical explanation.

A. Control Flow Graph (CFG)—A CFG describes the control flow of each basic block of a program.

B. Basic Block—A basic block represents a sequence of instructions with no breaking point (i.e., without any control). In other words, a basic block has: a single entry point; and a single exit point. A basic block may have several connected components. In the VESTIM tool, a basic block is represented by a Data Flow Graph (DFG). Each node of a DFG is an operation, while edges represent data dependencies between these operations. FIG. 14 represents a basic block composed of 14 nodes and four connected components.

C. Connected Component (CC)—A connected component is a part of a DFG without data dependencies with other parts of the DFG (i.e., with other connected components).

D. Directed Acyclic Graph (DAG)—A DAG is a directed DFG without any cycle (see FIG. 14).

E. Leaf node—A leaf node is a node with no successor node (see FIG. 14).

F. Heading node—A Heading node is a node with no previous node (see FIG. 14).

What is claimed is:

1. An assembly code performance evaluation apparatus, comprising:

a host computer having processing circuitry, memory and a host compiler, the host compiler operative to execute the program using test sequences and generate dynamic information;

a target digital signal processor (DSP) compiler communicating with the processing circuitry; and a performance estimation program implemented on the host processing circuitry and operative to annotate application source code, and generate an estimation of an optimized assembly code;

wherein the performance estimation program includes a plurality of rewriting rules that are applied to an RTL intermediate representation and wherein one of the plurality of rewriting rules is operative to remove a shift operation by 0, 1, or −1 following a multiplication operation.

2. The assembly code performance evaluation apparatus of claim 1 wherein the rewriting rules comprise rules operative to remove useless operations.

3. The assembly code performance evaluation apparatus of claim 1 wherein the rewriting rules comprise rules operative to synthesize DSP specific instructions.

4. The assembly code performance evaluation apparatus of claim 1 wherein the rewriting rules are applied on a Directed Acyclic Graph (DAG) that represents basic blocks of the application program.

5. The assembly code performance evaluation apparatus of claim 1 wherein one of the rewriting rules is operative to remove all arithmetic operations that perform computations on address registers within nested loops.

6. A method of evaluating performance of assembly code, comprising:

providing a target compiler;

providing a C code annotated with dynamic information based upon execution of the C code with test sequences on a host computer;

generating an RTL intermediate representation of the application;

defining a set of rewriting rules;

applying the set of rewriting rules to the RTL intermediate representation; and generating an estimation of an optimized assembly code;

wherein one of the rewriting rules is operative to remove a shift operation by 0, 1, or −1 following a multiplication operation.

7. The method of claim 6 wherein the set of rewriting rules is applied to the RTL representation so as to match as closely as possible a DSP execution scheme.

8. The method of claim 6 wherein the set of rewriting rules comprises rules operative to remove useless operations.

9. The method of claim 6 wherein the set of rewriting rules comprises rules operative to synthesize DSP specific instructions.

10. The method of claim 6 wherein the rewriting rules are applied on a Directed Acyclic Graph (DAG) that represents basic blocks of the application program.

11. The method of claim 6 wherein the rewriting rules are derived experientially using a programmer's knowledge.

12. The method of claim 6 wherein the rewriting rules are derived experimentally.

13. The method of claim 6 wherein one of the rewriting rules is operative to remove all arithmetic operations that perform computations on address registers within nested loops.

14. The method of claim 6 wherein one of the rewriting rules is operative to replace an addition operation with a negative operand by a subtraction operation with a positive operand.

15. The method of claim 6 wherein one of the rewriting rules is operative to synthesize a multiplication operation with two identical input data in a square root node.

16. A method of evaluating performance of assembly code, comprising:

providing a target compiler;

providing a C code annotated with dynamic information based upon execution of the C code with test sequences on a host computer;

generating an RTL intermediate representation of the application;

defining a set of rewriting rules;

applying the set of rewriting rules to the RTL intermediate representation; and generating an estimation of an optimized assembly code;

wherein one of the rewriting rules is operative to delete a shift operation by +/−16 after a memory read or write operation using an indirect addressing mode.

17. A method of evaluating performance of assembly code, comprising:

providing a target compiler;

providing a C code annotated with dynamic information based upon execution of the C code with test sequences on a host computer;

generating an RTL intermediate representation of the application;

defining a set of rewriting rules;

applying the set of rewriting rules to the RTL intermediate representation; and generating an estimation of an optimized assembly code;

wherein one of the rewriting rules is operative to remove a comparison operation with 0 before a branch operation.

* * * * *